(12) United States Patent
Matheron et al.

(10) Patent No.: US 8,182,866 B2
(45) Date of Patent: May 22, 2012

(54) METHOD OF PRODUCING A SUBSTRATE WHICH IS COATED WITH A MESOPOROUS LAYER AND USE THEREOF IN OPHTHALMIC OPTICS

(75) Inventors: Muriel Matheron, Paris (FR); John Biteau, Treasure Island, FL (US); Jean-Paul Cano, Saint Orens (FR); Jean-Pierre Boilot, Meudon la Foret (FR); Thierry Gacoin, Bure/Yvette (FR)

(73) Assignee: Essilor International Compagnie Generale d'Optique, Charenton-le-Pont (FR)

( * ) Notice: Subject to any disclaimer, the term of this patent is extended or adjusted under 35 U.S.C. 154(b) by 1344 days.

(21) Appl. No.: 11/573,137

(22) PCT Filed: May 3, 2005

(86) PCT No.: PCT/FR2005/050300
§ 371 (c)(1),
(2), (4) Date: Feb. 2, 2007

(87) PCT Pub. No.: WO2006/021698
PCT Pub. Date: Mar. 2, 2006

(65) Prior Publication Data
US 2008/0079894 A1    Apr. 3, 2008

(30) Foreign Application Priority Data

Aug. 3, 2004  (FR) .................................... 04 51767

(51) Int. Cl.
*B05D 5/06* (2006.01)
*C09D 183/02* (2006.01)
*C09D 183/04* (2006.01)
*G02B 1/04* (2006.01)

(52) U.S. Cl. ..................... 427/162; 427/164; 427/407.1; 427/336; 427/344; 427/352; 427/372.2; 427/387; 427/397.7; 427/397.8; 427/533; 427/534; 427/535; 427/553; 427/569; 427/578

(58) Field of Classification Search ................. 427/162, 427/164, 407.1, 336, 344, 352, 372.2, 387, 427/397.7, 397.8, 533–535, 553, 569, 578; 528/10–43

See application file for complete search history.

(56) References Cited

U.S. PATENT DOCUMENTS

| 5,858,457 A | * | 1/1999 | Brinker et al. ................ 427/162 |
| 2003/0157311 A1 | | 8/2003 | MacDougall et al. ..... 428/304.4 |
| 2004/0096593 A1 | * | 5/2004 | Lukas et al. .................. 427/558 |

FOREIGN PATENT DOCUMENTS

| EP | 1205438 | 5/2002 |
| WO | WO 99/09383 | 2/1999 |
| WO | WO 00/39028 | 7/2000 |
| WO | WO 03/024869 | 3/2003 |
| WO | WO 03/024869 A1 * | 3/2003 |

OTHER PUBLICATIONS

Written Opinion, PCT/ISA/237, for PCT/FR2005/050300, May 15, 2007, 6 pages.*

* cited by examiner

*Primary Examiner* — William Phillip Fletcher, III
(74) *Attorney, Agent, or Firm* — Fulbright & Jaworski L.L.P.

(57) ABSTRACT

The invention relates to a method of producing a substrate which is coated with a mesoporous layer and to the use thereof in ophthalmic optics. The inventive method comprises the following steps comprising: preparing a precursor sol containing (i) a precursor agent that is selected from compounds having formula M(X)4 (I), in which X is a hydrolysable group and M represents silicon or a tetravalent metal and mixtures thereof, (ii) at least one organic solvent, (iii) at least one pore-forming agent and (iv) water; depositing a film of the precursor sol on a main surface of the substrate; optionally consolidating the mesoporous structure of the deposited film; eliminating the pore-forming agent; and recovering the substrate coated with the mesoporous layer. The method is characterized in that: (i) the pore-forming agent is eliminated at a temperature of less than or equal to 150° C.; and (ii) the method comprises a step involving the introduction of at least one reactive agent bearing at least one hydrophobic group, before the deposition step and/or after said step.

36 Claims, 1 Drawing Sheet

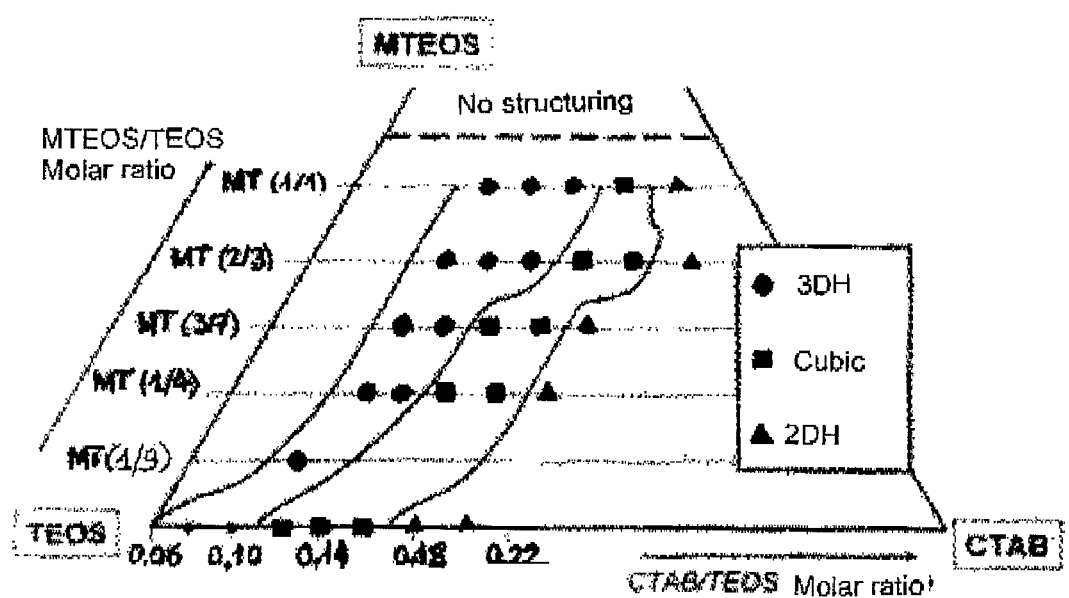

METHOD OF PRODUCING A SUBSTRATE WHICH IS COATED WITH A MESOPOROUS LAYER AND USE THEREOF IN OPHTHALMIC OPTICS

CROSS-REFERENCE TO RELATED APPLICATIONS

This application is a national phase application under 35 U.S.C. §371 of International Application No. PCT/FR2005/050300 filed 3 May 2005, which claims priority to French Application No. 0451767 filed 3 Aug. 2004. The entire text of each of the above-referenced disclosures is specifically incorporated herein by reference without disclaimer.

BACKGROUND OF THE INVENTION

A. Field of the Invention

This invention relates, in general, to a production method of a substrate, particularly in plastic material, coated with a mesoporous layer and coated substrates obtained in this way.

More particularly, this invention relates to a production method of a transparent substrate, preferably in a transparent plastic material, such as an optical or ophthalmic lens or lens blank, coated with a mesoporous layer, this mesoporous layer generally being a low refractive index layer, that is a refractive index $n \leq 1.50$, preferably $\leq 1.35$ ($\lambda = 633$ nm, T=ambient (20-25° C.).

B. Description of Related Art

The preparation of mesoporous layers has already been described in the state of the art.

Mesoporous materials are conventionally defined as materials containing pores of a diameter comprised between 2 and 50 nm.

The conventional method for preparing mesoporous layers consists in preparing a slightly polymerised silica sol, from a precursor such as a tetraalkoxysilane, particularly tetraethoxysilane (TEOS), said sol also containing water, an organic solvent, generally polar such as ethanol and a surface active agent, usually in an acid medium.

The concentration of surface active agent is at this stage considerably lower than the critical micellar concentration.

The solution is then deposited onto a substrate. During the deposition, the organic solvent evaporates, which increases the content of water, surface active agent and silicon dioxide in the film, and then the critical micellar concentration is reached. Since the solvent medium is very polar, the molecules of the surface active agent cluster together; the micelles having their polar head groups directed toward the solvent.

The silicon dioxide, which is also very polar, surrounds the micelles and so a structuring of the film is obtained.

As the evaporation continues, the micelles may change shape and organise themselves into more or less organised structures, until the film dries.

The porous material is obtained after the surface active agent is eliminated.

This elimination can be done by calcination (heating at a temperature of the order of at least 400° C.), or by more moderate methods (extraction using solvents, UV/ozone, plasma).

Instead of silicon dioxide, it is possible to use other precursor oxides such as metallic precursors, for example ones based on titanium, niobium or aluminium.

The mesoporous layers disclosed in the state of the art generally present high levels of porosity, greater than 40%, and these pores are filled with air, and have the ensuing properties: low refractive index and low dielectric coefficients, particularly.

The preferred applications of these films are in the field of electronics.

One of the disadvantages of these films is their low stability in presence of an atmosphere with a high degree of moisture. These films have a tendency to absorb water over the course of time, which modifies their initial properties.

This question of the stability of optical properties of mesoporous layers is particularly important if they are to be used in optical applications, particularly in antireflection stacks because, contrary to applications in the field of semi-conductors, where a variation of the dielectric coefficient within predefined limits can be envisaged without affecting the operation of the semi-conductor, very small variations in the refractive index have an immediately noticeable consequence in the field of optics, for example in altering the colour and the performance of an antireflection coating.

Many techniques can be found in prior art that aim to improve the stability of mesoporous films, in particular their dielectric properties.

These techniques include a step of calcination of the film at a temperature of 350-400° C.

The U.S. Pat. No. 5,858,457 discloses a method for preparing mesoporous films obtained from a sol comprising TEOS, ethanol, water and hydrochloric acid. The surface active agent used is cetyltrimethylammonium bromide $CH_3(CH_2)_{15}N(CH_3)_3Br$ (CTAB).

After being deposited, the layers are calcined at 400° C.

The patent mentions that other techniques (by solvent extraction) may be used.

The patent indicates that these films can be used as optical coatings and that they can also be used as antireflectives, without giving any more details about the way the mesoporous layer could accomplish this antireflection function.

The films obtained according to the technique of this patent have proved to change rapidly with time, in particular in damp atmospheres, and are not useable in practice.

The patent application WO 03024869 discloses a method for preparing mesoporous layers from a sol obtained by reaction between TEOS and an alkoxysilane substituted by an alkyl group (such as methyltrimethoxysilane) in a molar ratio of less than 3/1 and preferably less than 3/2.

This method improves the stability of the layers by limiting their ability to absorb water, while modifying relatively little their mechanical properties.

The layers obtained are used as insulating layers in semiconductors or for their optical properties in transmission filters.

The document US 2003157311 discloses the preparation of mesoporous layers with low dielectric constants from precursor sols prepared with TEOS as the first precursor agent and at least one organofunctional alkoxysilane, as a second precursor agent, such as a fluoroalkoxysilane or an alkyltrialkoxysilane, for example methyltriethoxysilane.

In general, the document US2003157311 discloses formulations wherein the molar ratio first precursor agent/second precursor agent can vary from 0.05 to 1.

The hydrolysis of alkoxysilanes is carried out sequentially and preferably in the presence of an organic acid such as acetic acid and necessitates the ageing of the sol obtained (typically 5 day).

After depositing the sol containing the two precursor agents, it is necessary to proceed to a calcination step (namely at 425° C.).

The document also describes, for low ratios of the two precursors above (5%), an post-treatment of the film after calcination, by treating with hexamethyldisilazane (HMDS), applied in the liquid phase, followed by a step of heating to 350° C.

The aim of this post-treatment is to limit the quantity of water adsorbed into the pores of the mesoporous material, in order to maintain a low dielectric constant.

Such a method does not appear to be adapted for treating organic substrates which would be degraded by calcination temperatures.

The document WO 9909383 also describes the post-treatment of a mesoporous TEOS gel with trimethylchlorosilane, after a solvent exchange has been carried out on the gel.

After the post-treatment, the gel is put back into solution under the effect of an ultrasound treatment, deposited on a substrate then calcined for one hour at 450° C.

The final mesoporous material obtained is used as a thermal insulator.

All these methods present a calcination step at a high temperature (of the order of 400° C.), which makes them unsuitable for the preparation of mesoporous films on organic substrates, and particularly transparent organic substrates such as optical or ophthalmic lenses.

BRIEF SUMMARY OF THE INVENTION

Thus it would be desirable to have a method that would be appropriate for all types of substrates, and particularly for transparent substrates made of organic material sensitive to thermal degradation.

Also, it would be desirable to have mesoporous films with increased stability over time, particularly for applications in the field of optics, and more specifically ophthalmic optics, and particularly mesoporous films with a refractive index which is stable over time.

Thus the object of the invention is to provide a production method for a substrate coated with a mesoporous layer which can be applied to all types of substrates and particularly to substrates made of organic materials, particularly those that are heat sensitive.

A further object of the invention is a method as mentioned above that makes it possible to obtain mesoporous films with a refractive index that is stable over time.

Another object of the invention is a method as mentioned above, wherein the mesoporous film constitutes the low refractive index layer of a bilayer antireflection coating or a multilayer coating (multilayer meaning here a stack of more than two layers).

A further object of the invention is a substrate coated with a mesoporous layer, particularly a layer having a low refractive index, and more particularly constituting the low refractive index layer of an antireflection bilayer coating, or an antireflection multilayer coating, or a Bragg mirror.

Lastly, an object of the invention is a substrate coated with a mesoporous layer as mentioned above constituting an optical or ophthalmic lens.

The aforementioned aims are met according to the invention, by a method for producing a substrate coated with a mesoporous layer comprising:

a) the preparation of a precursor sol of a mesoporous layer containing a precursor agent selected from compounds with the formula:

$$M(X)_4 \tag{I}$$

wherein, X is a hydrolysable group preferably selected from among the groups alkoxy, esters and halogens, preferably alkoxy, and M represents silicon or a tetravalent metal, preferably silicon, and mixtures of these; at least one organic solvent; at least one pore forming agent; and water, and optionally a catalyst for the hydrolysis of the X groups;

b) depositing a film of the precursor sol on a main surface of the substrate and the formation of the mesoporous structure of the deposited film;

c) optionally the consolidation of the mesoporous structure of the deposited film;

d) the elimination of the pore forming agent; and e) obtaining the substrate coated with the mesoporous layer;

the method being characterised in that:

(i) the elimination of the pore forming agent is carried out at a temperature $\leq 150°$ C., preferably $\leq 130°$ C., more preferably $\leq 120°$ C. and still more preferably $\leq 110°$ C.; and (ii) the method includes a step of introducing a reactive agent bearing at least one hydrophobic group before the deposition step (b) of the film of precursor sol and/or after the step (b).

When a step (c) is carried out, the introduction of said reactive agent bearing at least one hydrophobic group is carried out after the step (c).

Preferably, the introduction of said reactive agent bearing at least one hydrophobic group is carried out after the step (d).

The term "hydrophobic" groups as used in the present invention is understood to mean combinations of atoms that have no propensity for bonding (particularly by H, Van der Waals, dipolar bonds) with water molecules.

Preferably, the method according to the invention includes no step carried out at a temperature of over 150° C., and in particular the step of consolidating the mesoporous structure (c) of the deposited film includes heating to a temperature $\leq 150°$ C., preferably $\leq 130°$ C., more preferably $\leq 120°$ C. and still more preferably $\leq 110°$ C.

DETAILED DESCRIPTION OF THE INVENTION

In the rest of the description, we will refer to FIG. 1 in the appendix, which presents a phase diagram of MTEOS/TEOS films synthesised with different quantities of MTEOS.

Precursor sols of mesoporous layers are known and generally contain at least one precursor agent of formula (I) or a hydrolysate of this precursor agent, at least one organic solvent, a pore forming agent and water, the medium in which the precursor agent of formula (I) is found being in general an acidic medium, the acidic nature of the medium being obtained by addition, for example, of an inorganic acid, typically HCl.

As indicated above, the precursor agent is selected from compounds and mixtures of compounds with the formula:

$$M(X)_4 \tag{I}$$

wherein the groups X, identical or different, are hydrolysable groups preferably selected from the alkoxy groups, particularly $C_1$-$C_4$ alkoxy, esters

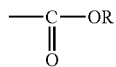

in which R is an alkyl radical, preferably in $C_1$-$C_6$, preferably methyl or ethyl, and halogens such as Cl, Br and I, and M is silicon or a tetravalent metal.

Preferably, the X groups are alkoxy radicals, and particularly methoxy or ethoxy, and preferably ethoxy.

Among the tetravalent metals represented by M, mention can be made of Ti, Zr, Sn.

M is preferably silicon.

The preferred compound of formula (I) is tetraethoxysilane Si(OC$_2$H$_5$)$_4$ (TEOS).

The quantity of precursor agent in the sol is in general from 10 to 30% by weight compared to the total weight of precursor sol.

The organic solvents or mixtures of organic solvents suitable for the preparation of the precursor sol according to the invention are all conventionally used solvents, and more particularly the polar solvents, especially alkanols such as ethanol, methanol, isopropanol, isobutanol, and n-butanol and mixtures of these.

In general, the solvent accounts for between 40 and 90% by weight compared to the total weight of precursor sol.

The preferred solvent is ethanol.

The pore forming agent of the precursor sol can be a non-surface active or a surface active pore forming agent.

Useable non-surface active pore forming agents include:
ethylene polyoxide, with a molar mass comprised between 50000 and 300000,
polyethylene glycol, with a molar mass comprised between 50000 and 300000,
gamma-cyclodextrin, lactic acid,
sugars such as D-glucose, maltose.

The surface active pore forming agent of the precursor sol can be comprised of a single surface active compound or of a mixture of surface active compounds. The surface active compounds can be non-ionic, cationic, anionic or amphoteric.

Among the preferred surface active compounds, mention can be made of cetyltrimethylammonium bromide (CTAB), cetyltrimethylammonium chloride, diblock copolymers of ethylene oxide and propylene oxide, triblock copolymers of ethylene oxide and propylene oxide, poly(oxyalkylene)alkylethers, particularly poly(oxyethylene)alkylethers such as, for example, polyoxyethylene(10)stearyl ether, and ethoxylated acetylenic diols. The preferred surface active compound is cetyltrimethylammonium bromide.

Most of these surface active agents are available commercially, such as, for example, the triblock copolymers polyoxyethylene-polyoxypropylene-polyoxyethylene marketed by BASF under the name PLURONIC® and the poly(ethyleneoxy)alkyl ethers marketed by ICI under the names BRIJ 56® (C$_{16}$H$_{33}$(OCH$_2$CH$_2$)$_{10}$OH), BRIJ 58® (C$_{16}$H$_{33}$(OCH$_2$CH$_2$)$_{20}$OH) and BRIJ 76® (C$_{18}$H$_{37}$(OCH$_2$CH$_2$)$_{10}$OH).

In general, the pore forming agent accounts for 2 to 10% of the total weight of precursor sol.

Typically, the weight ratio of the pore forming agent to the precursor agent of formula (I) and optionally the reactive agent bearing at least one hydrophobic group where the latter is added to the precursor sol, varies from 0.01 to 5, preferably from 0.05 to 1.

The water present in the precursor sol generally accounts for 10 to 20% by weight of the total weight of the precursor sol.

The deposition step (b) of the film of precursor sol on the main surface of the substrate, whether or not the precursor sol has been treated with a reactive agent bearing at least one hydrophobic group, can be carried out by any conventional method, for example by deposit by dip coating, deposit by spraying or deposit by spin coating, preferably by spin coating.

Preferably, deposition step (b) is carried out in an atmosphere with a humidity rate (RH) varying from 40 to 80%.

The consolidation step (c) of the mesoporous structure of the precursor sol deposited consists in optionally terminating the elimination of the organic solvent or mixture of organic solvents from the film of the precursor sol and continuing the condensation of the silanols present in the sol, generally by heating. Preferably, step (c) is carried out by heating to a temperature $\leq 150°$ C., preferably $\leq 130°$ C., more preferably $\leq 120°$ C. and still more preferably $\leq 110°$ C.

As mentioned previously, the elimination step of the pore forming agent (d) is carried out at a temperature $\leq 150°$ C., preferably $\leq 130°$ C., more preferably $\leq 120°$ C. and still more preferably $\leq 110°$ C.

This step can be carried out by extraction using an organic solvent or a mixture of organic solvents, a fluid in the supercritical state (typically supercritical CO$_2$), by degradation using UV and/or ozone radiation, treating by plasma or corona discharge. Preferably, the elimination of the pore forming agent is carried out by extraction. Preferably, the extraction is carried out using a solvent by soaking the mesoporous film formed and consolidated in a preferably organic solvent or mixture of solvents heated to a temperature $\leq 150°$ C. Any suitable solvent can be used that has a boiling point $\leq 150°$ C., preferably $\leq 130°$ C., more preferably $\leq 120°$ C. and still more preferably $\leq 110°$ C. The preferred solvents are the alkanols, particularly ethanol (reflux at 78° C.), alkyl ketones, particularly acetone (reflux at 56° C.) and chloroalkyls such as dichloromethane.

The extraction of the pore forming agent using an organic solvent, preferably by reflux, makes it possible to maintain more hydrophobic groups in the final mesoporous layer and good control of the final thickness of the mesoporous layer.

The reactive agent bearing at least one hydrophobic group can also be introduced during step (d), particularly when an extraction solvent is used during this step (d).

According to a first embodiment of the invention, the step (ii) of introducing a reactive agent bearing at least one hydrophobic group comprises introducing, before the deposition step (b) of the film, at least one first reagent bearing at least one hydrophobic group and introducing after step (b) or (c) at least one second reagent bearing at least one hydrophobic group, different from the first reagent.

The first reagents bearing at least one hydrophobic group are preferably added directly into the precursor sol, generally in the form of a solution in an organic solvent and are preferably selected from among compounds and mixtures of compounds with the formula:

$$(R^1)_{n1}(R^2)_{n2}Si \qquad (II)$$

or

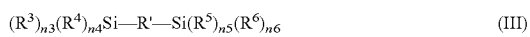

$$(R^3)_{n3}(R^4)_{n4}Si-R'-Si(R^5)_{n5}(R^6)_{n6} \qquad (III)$$

wherein:

$R^1$, $R^3$ and $R^5$ represent a saturated or unsaturated hydrocarbon group, preferably in $C_1$-$C_8$ and more preferably in $C_1$-$C_4$, for example an alkyl group, such as methyl or ethyl, a vinyl group, an aryl group, for example phenyl, optionally substituted, particularly by one or several alkyl groups in $C_1$-$C_4$; and the fluorinated or perfluorinated analogues of the hydrocarbon group;

$R^2$, $R^4$ and $R^6$ represent a hydrolysable group, preferably selected from among the alkoxy groups, particularly alkoxy in $C_1$-$C_4$, esters

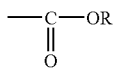

in which R is an alkyl radical, preferably in $C_1$-$C_6$, particularly methyl or ethyl, and halogens such as Cl, Br and I;

R' represents an alkylene group such as —$CH_2$—, —$CH_2$—$CH_2$—, arylene such as phenylene;

$n_1$ is an integer from 1 to 3;
$n_2$ is an integer from 1 to 3;
$n_1+n_2=4$;
$n_3$, $n_4$, $n_5$, and $n_6$ are integers from 0 to 3 with the condition that the sums $n_3+n_5$ and $n_4+n_6$ are not equal to zero; and
$n_3+n_4=n_5+n_6=3$.

Preferably $R^1$, $R^3$ and $R^5$ represent methyl and $R^2$, $R^4$ and $R^6$ represent an alkoxy group, particularly methoxy or ethoxy.

The preferred first hydrophobic reagents are the alkyltrialkoxysilanes, such as methyltriethoxysilane (MTEOS), vinyltrialkoxysilanes, such as vinyltriethoxysilane, fluoroalkyltrialkoxysilanes such as 3,3,3 trifluoropropyltrimethoxysilane.

The particularly preferred first reagent bearing at least one hydrophobic group is methyltriethoxysilane (MTEOS) $CH_3(OC_2H_5)_3Si$.

In general, the molar ratio of the first reactive agent with at least one hydrophobic group to the precursor agent of formula (I) varies from 10/90 to 50/50 and is preferably 20/30, particularly when MTEOS is used as first hydrophobic reagent in the precursor sol.

A particularly recommended method for the incorporation is a two-step method, comprising a first step of hydrolysis in an acidic medium, and of condensation of the compound $M(X)_4$ as defined above, followed by a second step of mixing with the first reactive agent with a hydrophobic group.

The interest of this type of hydrolysis in two steps is to be able to introduce large quantities of the first hydrophobic reactive agent and reach a molar ratio of the first reactive agent with a hydrophobic group to the precursor agent of formula (I) of 50/50, while preserving an ordered structure of the mesoporous layer.

The hydrolysis is carried out in acidic medium, by adding water at a pH preferably comprised between 1 and 2.

During the first step, the hydrolysis of the compound $M(X)_4$ is preferably carried out in the presence of a slight excess of water, typically a quantity of water of more than 1 to 1.5 times the molar quantity of water needed for stoichiometric hydrolysis of the hydrolysable groups of the compound $M(X)_4$.

Then the reaction is allowed to proceed (ageing of the sol). During this operation, the sol is preferably maintained at a temperature of the order of 50 to 70° C., typically 60° C., for 30 minutes to 2 hours.

The condensation can also be carried out at lower temperatures, but with longer condensation times.

Preferably once again, the precursor sol must be deposited and the film of the precursor sol formed rapidly after the introduction of the first hydrophobic reagent, preferably within a time of 5 minutes or less, and more preferably within a time of two minutes or less.

By proceeding in this very short time frame, it is possible to minimise the condensation reaction of the first reagent before the deposition and formation of the mesoporous layer.

In other words, a simply partial hydrolysis of the first hydrophobic reagent is induced without inducing a significant formation of condensed species originating from the first reagent.

The introduction of the second hydrophobic reagent or the second mixture of hydrophobic reagents is preferably carried out by contact of the second hydrophobic reagent or mixture of reagents in the liquid or vapour state, preferably the vapour state, with the mesoporous layer obtained after elimination of the pore forming agent.

Alternatively, the second hydrophobic reagent or mixture of hydrophobic reagents can be introduced during step (d); particularly when an extraction solvent is used, the second hydrophobic reagent or mixture of hydrophobic reagents can be solubilised in the extraction solvent.

The second reagents bearing at least one hydrophobic group particularly suitable for this invention are compounds, preferably of silicon, with a single function capable of reacting with the remaining hydroxyl groups of the mesoporous layer, particularly the Si—Cl, Si—NH—, Si—OR functions where R is an alkyl group, preferably in $C_1$-$C_4$.

The preferred hydrophobic functions of the silicon compounds are alkyl groups, preferably methyl, alkyl, aryl, fluoroalkyl, perfluoroalkyl groups.

As a second reagent, a fluorinated chlorosilane such as 3,3,3-trifluoropropyldimethyl chlorosilane, or an alkylalkoxysilane such as trimethylmethoxysilane can advantageously be used.

In a preferred embodiment, the second reagent bearing hydrophobic groups is a trialkylsilyl, preferably a trimethylsilyl, a silazane, particularly a disilazane and more particularly hexamethyldisilazane $(CH_3)_3Si$—NH—$Si(CH_3)_3$ (HMDS).

Trimethylchlorosilane can also advantageously be used as a second hydrophobic reagent.

According to a second embodiment, the reagent or mixture of reagents is only introduced after the step (d) of elimination of the pore forming agent, in the same way and with the same second hydrophobic reagents as described above. In this second embodiment, with the exception of the fact that there is no introduction of the first hydrophobic reagent into the precursor sol, the method is the same as that described above.

The structure of the mesoporous layer according to the invention can be ordered or not.

Preferably, the structure of the mesoporous layer is ordered.

In general, an ordered structure gives better mechanical properties and allows for greater reproducibility of the method.

The ordered structure can be particularly of the 3d hexagonal, cubic or 2d hexagonal type.

The 3d hexagonal type of structure is preferred.

The term ordered, as used herein is understood to mean a structure with a periodic organisation in a thickness of at least 20 nm, and in a zone of a dimension of at least 20 nm, preferably 300 nm in the plane of the deposited layer.

By choosing the weight ratio $$\frac{[\text{pore forming agent}]}{[MX_4]}$$

in step (a), it is possible to obtain different types of ordered structures for the final film.

In particular, when the pore forming agent is CTAB and the $MX_4$ compound is TEOS, if no reactive agent bearing at least one hydrophobic group is added before step (b), one obtains:

a 3d hexagonal structure (3dH) for a weight ratio $$0.140 \leq (CTAB/TEOS) \leq 0.175$$

a cubic structure (C) for a weight ratio $$0.210 \leq (CTAB/TEOS) \leq 0.245$$

a 2d hexagonal structure (2DH) for a weight ratio $$0.280 \leq (CTAB/TEOS) \leq 0.350$$

Preferably the mesoporous layers obtained according to the invention method have a 3d hexagonal structure.

In the presence of a MTEOS hydrophobic agent added before step (b), with a MTEOS/TEOS molar ratio=1, the weight ratios quoted above are appreciably different:

3d hexagonal structure:

$$0.210 \leq (CTAB/TEOS) \leq 0.280$$

cubic structure:

$$0.297 \leq (CTAB/TEOS) \leq 0.332$$

2d hexagonal structure:

$$0.350 \leq (CTAB/TEOS) \leq 0.385$$

When the MTEOS/TEOS molar ratio is greater than 1, the films are no longer structured.

When the MTEOS/TEOS molar ratio is less than 1, the mesoporous layer according to the invention has a 3d hexagonal, cubic and 2d hexagonal type of structure. The greater the values of the MTEOS/TEOS molar ratios, the greater the CTAB/TEOS molar ratios limiting the phases.

The mesoporous layer according to the invention generally has a thickness ranging from 100 to 500 nm, preferably from 150 to 400 nm. Typically, it has a low refractive index, that is a refractive index layer $\leq 1.50$ ($\lambda=633$ nm, $T=20-25°$ C.) and preferably 1.20 to 1.35.

The substrate can be comprised of any transparent or non-transparent solid material, such as inorganic glass, a ceramic, a vitroceramic, a metal or a plastic, thermoplastic or thermosetting material (organic glass). Preferably, the substrate is a transparent material and more preferably a transparent plastic material.

Among the thermoplastic material suitable for substrates, mention can be made of (meth)acrylic (co)polymers, in particular poly(methyl methacrylate) (PMMA), polyvinylbutyral (PVB), polycarbonates (PC), polyurethanes (PU), poly (thiourethanes), polyol allylcarbonate (co)polymers, thermoplastic vinyl ethylene/acetate copolymers, polyesters such as poly(ethylene terephthalate) (PET) or poly(butylene terephthalate) (PBT), polyepisulphides, polyepoxides, polycarbonate/polyester copolymers, cyclo-olefin copolymers such as ethylene/norbornene copolymers or ethylene/cyclopentadiene copolymers and combinations of these.

The preferred substrates according to the invention include substrates obtained by polymerisation of alkyl methacrylates, particularly alkyl methacrylates in C1-C4, such as methyl (meth)acrylate and ethyl(meth)acrylate, allyl derivatives such as linear or branched aliphatic or aromatic polyol allylcarbonates, thio(meth)acrylates, polythiol/polyisocyanate precursor mixtures (for obtaining polythiourethanes), episulphides, polyethoxylated aromatic(meth)acrylates such as polyethoxylated bisphenol di(meth)acrylates.

Other suitable substrates include polycarbonates (PC).

Among the recommended substrates, mention can be made of substrates obtained by (co)polymerisation of polyol allylcarbonates, including (co)polymers of ethyleneglycol bis allyl carbonate, diethyleneglycol bis 2-methyl carbonate, diethyleneglycol bis(allyl carbonate), ethyleneglycol bis (2-chloro allyl carbonate), triethyleneglycol bis(allyl carbonate), 1,3-propanediol bis(allyl carbonate), propyleneglycol bis(2-ethyl allyl carbonate), 1,3-butenediol bis(allyl carbonate), 1,4-butenediol bis(2-bromo allyl carbonate), dipropyleneglycol bis(allyl carbonate), trimethyleneglycol bis(2-ethyl allyl carbonate), pentamethyleneglycol bis(allyl carbonate), isopropylene his phenol-A bis(allyl carbonate).

Particularly recommended substrates are substrates obtained by (co)polymerisation of diethyleneglycol bis allyl carbonate, sold, for example, with the brand name CR 39® by PPG Industries (ORMA® ESSILOR lenses).

Among other particularly recommended substrates, mention can be made of substrates obtained by polymerisation of thio(meth)acrylic monomers, such as those described in the application for the French patent FR-A-2 734 827 and polycarbonates.

Obviously, the substrates can be obtained by polymerisation of mixtures of the above monomers, or may also comprise mixtures of these polymers and (co)polymers.

The mesoporous layer can be formed on a surface of a bare substrate, that is, not coated or on one that is already coated with one or several functional coatings.

Thus, in ophthalmic optics, covering a main surface of a substrate made of transparent organic material, for example an ophthalmic lens, with one or several functional coatings to improve the optical and/or mechanical properties of the final lens is well known. Also, the main substrate surface can be previously supplied with a primer coating that improves the resistance to impact and/or the adherence of the subsequent layers in the final product, an anti-abrasion coating, an anti-reflective coating, a polarised coating, a photochromic coating, a coloured coating or a stack of two or more of these coatings.

The primer coatings that improve the resistance to impact are preferably polyurethane or acrylic latexes.

The hard coatings that resist abrasion are preferably poly (meth)acrylate or silicone based coatings.

Examples of recommended coatings in the present invention include coatings obtained from silane hydrolysate based compounds, particularly epoxysilane hydrolysate based coatings such as those disclosed in French patent No 93 026 49 and in U.S. Pat. No. 4,211,823 and U.S. Pat. No. 5,015,523.

A formulation for a preferred anti-abrasion coating comprises a hydrolysate of epoxysilane and dialkyl dialkoxysilane, colloidal silicon and a catalytic quantity of aluminium acetylacetonate, the rest being essentially composed of solvents conventionally used for such formulations.

Preferably, the hydrolysate used is a hydrolysate of γ-glycidoxypropyltrimethoxysilane (GLYMO) and of dimethyldiethoxysilane (DMDES).

In a preferred embodiment of the invention, the mesoporous layer is formed on a high refractive index layer (HI, n>1.50), previously deposited on the substrate, and thus forms a low refractive index layer (LI) of a bilayer antireflection coating. The HI layer is preferably obtained by hardening a formulation containing an alkoxylane hydrolysate, particularly an epoxysilane, preferably an epoxytrialkoxysilane and high refractive index colloids or precursors of these.

In particular, the colloids can be $TiO_2$, $ZrO_2$, $Sb_2O_5$, $SnO_2$, $WO_3$ or $Al_2O_3$ colloids.

This HI layer has a refractive index higher than 1.50, preferably higher than 1.7, more preferably from 1.72 to 1.82 and still more preferably from 1.72 to 1.78.

Its thickness can vary according to the antireflection stack typically from 10-200 nm, preferably 80 to 150 nm.

This HI layer can be an HI layer of an antireflection stack containing several alternate high refractive index and low refractive index layers, particularly when the antireflection stack is multilayer.

The mesoporous layer according to the invention is itself, when it constitutes the external layer of an antireflection stack, preferably covered with a hydrophobic and/or oleophobic top coat that is generally less than 10 nm thick. These hydrophobic and/or oleophobic top coats are well known in the art and are generally manufactured from fluorosilicone or fluorosilazanes, that is, silicones and silazanes containing fluorine atoms. A hydrophobic and/or oleophobic top coat material is marketed by SHIN ETSU under the name KP801M®. These coatings are generally obtained by conventional thermal evaporation techniques.

Another preferred category of fluorosilanes for forming top coats are those containing fluoropolyether groups disclosed in U.S. Pat. No. 6,277,485.

These fluorosilanes are given by the general formula:

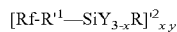

in which Rf is a monovalent or divalent perfluoropolyether group, $R'^1$ is a divalent alkylene, arylene or a combination of these two, optionally containing one or several heteroatoms or functional groups and optionally substituted by halogens, and preferably containing 2 to 16 carbon atoms; $R'^2$ is a lower alkyl group (that is, an alkyl group in $C_1$-$C_4$); Y is a halogen atom, a lower alkoxy group (that is, an alkoxy group in $C_1$-$C_4$, preferably methoxy or ethoxy), or a lower acyloxy group (that is, $-OC(O)R'^3$ where $R'^3$ is an alkyl group in $C_1$-$C_4$); x is 0 or 1; and y is 1 (Rf is monovalent) or 2 (Rf is divalent).

Suitable compounds generally have an average number molecular weight of at least 1000. Preferably, Y is an alkoxy group and Rf is a perfluoropolyether group.

Other recommended fluorosilanes are those with the formula:

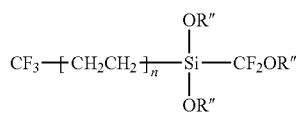

where n=5, 7, 9 or 11 and R is an alkyl group, preferably in C1-C6 such as $-CH_3$, $-C_2H_5$ and $-C_3H_7$;

$CF_3CH_2CH_2SiCl_3$;

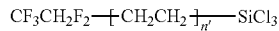

$CF_3CH_2F_2CH_2CH_2-SiR''Cl_2$ where n'=7 or 9 and R" is as defined above.

Equally recommended fluorosilanes are organic fluoropolyether groups disclosed in U.S. Pat. No. 6,183,872.

Fluoropolymers with organic groups bearing Si groups are represented by the following general formula and with a molecular weight of $5.10^2$ to $1.10^5$:

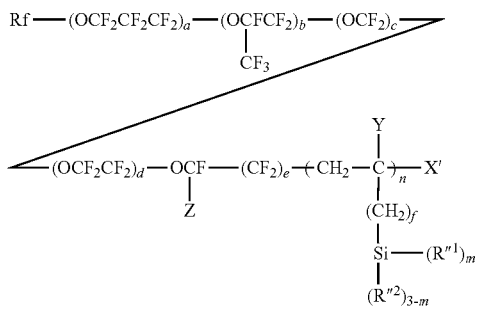

wherein Rf represents a perfluoroalkyl group; Z represents a fluoro or trifluoromethyl group; a, b, c, d and e each represent, independently from each other, 0 or an integer greater than or equal to 1, provided that the sum a+b+c+d+e is not less than 1 and that the order of the repeated units figuring between the brackets indexed as a, b, c, d and e is not limited to the order represented; Y represents H or an alkyl group comprising from 1 to 4 carbon atoms; X' represents a hydrogen, bromine or iodine atom; $R''^1$ represents a hydroxyl group or a hydrolysable group; $R''^2$ represents an atom of hydrogen or a monovalent hydrocarbon group; l represents 0, 1 or 2; m represents 1, 2 or 3; and n represents an integer at least equal to 1, preferably at least equal to 2.

The mesoporous layers according to the invention have applications in very different fields: optical lenses, particularly ophthalmic lenses, particularly eyewear lenses, guided optics, diffraction networks, Bragg mirrors insulators for microelectronics, filtration membranes and stationary phases of chromatography.

The following examples illustrate the present invention. All percentages are expressed by weight unless otherwise indicated.

EXAMPLES

Example 1

TEOS-Based Mesoporous Layers Modified by Post-Synthesis Grafting 1. a. Elaboration of the Precursor Sol
Reagents
TEOS: $Si(OC_2H_5)_4$
Absolute ethanol
Diluted hydrochloric acid (pH=1.25)
CTAB (surfactant): $C_{16}H_{33}N^+(CH_3)_3, Br^-$
Preparation of the Inorganic Sol The TEOS is hydrolysed then partially condensed by heating for 1 hour at 60° C. in an ethanol/dilute hydrochloric acid medium, in a flask equipped with a cooler. The molar ratios are as follows:

| TEOS | Ethanol | $H_2O$ [1] |
|---|---|---|
| 1 | 3.8 | 5 |

[1] water at pH 1.25 (acidified with hydrochloric acid)

Preparation of a Surfactant Solution in Ethanol and Mixing with the Inorganic Sol The CTAB is dissolved in ethanol by passing ultrasound waves through it for a few seconds. The inorganic sol is added once it has cooled. This step is carried out such that in the final mixture the molar ratio CTAB/Si is 0.10. The volume of ethanol used to dissolve the CTAB is equal to the volume of sol added.

1. b. Depositing the Precursor Sol

Substrate used: silicon plate 2.5 cm×2.5 cm.

A few drops of the mixture are deposited onto the substrate, which is then set spinning at 3000 rpm for 2 minutes (acceleration of about 33 rotations/$s^2$). The deposition takes place in a chamber in which the hygrometry is controlled by a nitrogen flow that bubbles through a water tank. It has to be carried out in a sufficiently humid atmosphere (RH>60%, with a sustained nitrogen flow), otherwise the organisation of the CTAB micelles into a periodic structure with large areas of coherence does not take place correctly.

The substrates obtained are divided into two batches.

1. c. Consolidation of the Mesoporous Structure

The substrates coated with the film of precursor sol of the first batch are heated at 110° C. for 12 hours to consolidate the mesoporous structure, which is a 3d hexagonal structure.

1. d. Elimination of the Surfactant

The surfactant is eliminated by calcination (comparative) or by extraction with an organic solvent (invention).

Calcination

The calcination is carried out on substrates of the $2^{nd}$ batch, not subjected to step 1 c).

The surfactant is broken down by calcination at 450° C., in air: increasing temperature to 200° C. in 1h40, increasing temperature to 300° C. in 3h20, plateau region of one hour, increasing temperature to 450° C. in 2h30, plateau region of one hour.

Solvent Extraction

The extraction is carried out on substrates from the $1^{st}$ batch, after step c).

This involves solubilising the CTAB, by soaking the film either in ethanol at reflux (78° C.) for 5 hours, or in acetone at reflux (56° C.) for 2 hours. These processes are both preceded by thermal consolidation at 110° C. for 12 hours.

The 3d hexagonal structure is maintained after the elimination of the CTAB.

With these two methods of eliminating the surface active, the periodic structure is preserved, with a certain deformation. The film obtained is extremely porous (void spaces about 55%). It contains both well calibrated mesopores, with a 4 nm diameter (micelle cavities), and micropores measuring a few angstroms, situated on the inside of the silica walls and which are in principle not monodispersed.

1. e. Final Refractive Index After Elimination of the Surfactant.

The index is measured by spectroscopy ellipsometry between 1.5 an 5 eV, with a fixed angle of incidence (close to 70°). The measurement is taken with a Jobin-Yvon ellipsometer, with the settings II and III (modulator at 0° and analyser at 45° then modulator at 45° and analyser at 45°). The mesoporous layer, deposited on the silica substrate, is modelled by a Bruggemann effective medium approximation with two components (silica+void). Below, the index values are given for $\lambda$=633 nm, at T=20-25° C.

|  | Extraction method | | |
| --- | --- | --- | --- |
|  | Calcination | Ethanol | Acetone |
| Refractive index | 1.23 | 1.29 | 1.27 |

1. f. Treating the Mesoporous Layers with a Hydrophobic Agent

HMDS Grafting Procedure

Silane used: hexamethyldisilazane (HMDS) $(CH_3)_3$—Si—NH—Si—$(CH_3)_3$.

The mesoporous film is placed in a Schlenk flask with 200 μL of HMDS. The whole system is placed in a static primary vacuum (1 to 5 mm of Hg), then heated to 70° C. for 5 minutes.

The HMDS grafting, according to the above method, takes place immediately after removal from the oven (calcination) or immediately after the extraction (organic solvent extraction).

The film preserves its 3d hexagonal structure.

1. g. Index and Stability

The coated substrates are left at ambient temperature and any change in the refractive index ($\lambda$=633 nm, T=20-25° C.) of the mesoporous layers is followed by spectroscopy ellipsometry, by comparing with a calcined non-grafted TEOS film.

|  | Index at t = 0 | Index at t = 4 days | Index at t = 11 days | Index at t = 22 days |
| --- | --- | --- | --- | --- |
| Calcined TEOS film (comparative) | 1.23 | 1.26 | 1.30 | 1.31 |
| TEOS film calcined then grafted with HMDS (comparative) | 1.28 | 1.29 | 1.30 | 1.32 |
| TEOS film extracted with acetone then grafted with HMDS | 1.32 | 1.32 | 1.32 | 1.32 |

The table shows that the mesoporous layer obtained by the method of the invention shows remarkable stability of the refractive index. This layer is of optical quality.

Example 2

TEOS-Based Mesoporous Layers Modified During Synthesis and by Post-Synthesis Grafting The basic substrates are the same as in Example 1.

2. a. Elaboration of the Precursor Sol

The silica sol produced in Example 1 is comprised of small polymer clusters of partially condensed silicon dioxide, containing a large quantity of silanol functions. The latter disappear when the MTEOS is introduced into the mixture. Thus we designed this synthesis such that the set {silicon dioxide polymer cluster+MTEOS} remains sufficiently hydrophilic to not disturb the hydrophilic-hydrophobic balance of the system (because the polymerised MTEOS is hydrophobic, unlike the hydrolysed uncondensed MTEOS).

In the synthesis disclosed below, the molar ratios CTAB/TEOS and MTEOS/TEOS are 0.16 and 2/3 respectively.

Preparation of the Silica Sol

The TEOS is hydrolysed and condensed according to the method described in Example 1. The sol obtained is cooled to 0° C. in an ice bath.

Preparation of the Surface Active Solution and Addition of MTEOS

Meanwhile, the stock solution is prepared at 48.7 g/L of CTAB in ethanol. 6.7 mL of solution are taken, then 0.75 mL of pure MTEOS are added to it.

Silica/MTEOS/Surface Active Mixture 3 mL of silica sol is placed in a vial plunged in an ice bath, and 67 µL of acidified water (HCl pH=1.25) is added. Then this solution is added to the CTAB/ethanol/MTEOS mixture while stirring.

2. b. Depositing the Precursor Sol 1 minute 30 seconds later, a few drops of the mixture are deposited on the substrate, which is then set spinning at 3000 rpm for 2 minutes (acceleration of about 33 rotations/s$^2$). The depositing takes place in a chamber with a strong nitrogen flow in which the relative humidity of the atmosphere equals 51% at T=20-25° C.

2. c. Consolidation of the Mesoporous Structure

The substrates coated with the film of precursor sol are heated at 110° C. for 12 hours to consolidate the mesoporous structure (condensation between the silanols).

Structure Obtained

The films obtained, which are about 260 nm thick, have a 3d hexagonal structure.

2. d. Elimination of the Surfactant

The surfactant is eliminated by extraction with an organic solvent.

The film is placed in acetone at reflux for 2 hours.

2. e. Treating the Mesoporous Layers with a Hydrophobic Agent

After extracting the surface active with acetone, the mesoporous layers are immediately grafted with HMDS according to the method described above.

The film preserves its 3d hexagonal structure.

The coated substrates are maintained at ambient temperature and the change in refractive index of the mesoporous layers is determined.

|  | Index at t = 0 | Index at t = 2 days | Index at t = 11 days | Index at t = 11 weeks |
| --- | --- | --- | --- | --- |
| MTEOS/TEOS Extraction with acetone then grafting with HMDS | 1.30 | 1.30 | 1.30 | 1.31 |

Thus a low index layer is obtained that is stable (over a certain period) using mild treatments compatible with the substrates and coatings used for producing ophthalmic glasses.

We also repeated Example 2 with different quantities of MTEOS and different quantities of CTAB and formed the corresponding films.

In this way the phase diagram of the ternary system MTEOS-TEOS-CTAB could be plotted.

This is shown in FIG. 1.

This diagram reveals the existence of 3 phases according to the CTAB/TEOS and MT (MTEOS/TEOS ratio) molar ratios.

Above an MT ratio of 1, no further structuring is observed.

Example 3

Introducing a reactive agent with a hydrophobic group concomitantly with the elimination of the pore forming agent (after the depositing step b): grafting trimethylmethoxysilane $(CH_3)_3SiOCH_3$ (TMMOS) into the methylethylketone $CH_3$—CO—$CH_2CH_3$ (MEK); simultaneous elimination of the CTAB.

This example describes a grafting method of a hydrophobic agent that is introduced at the time of step (d).

Steps a), b) and c) from Example 1 are reproduced identically.

A film made of mesoporous silicon dioxide with a 3d hexagonal structure, structured by the CTAB obtained after steps a) and b) (about 4 cm$^2$, initial thickness 340 nm) is plunged into 125 mL of methyl ethyl ketone MEK. This solvent is preferred to acetone because its boiling point is higher (80° C. compared with 56° C.), which makes it possible to speed up the grafting reaction. 1 mL of TMMOS is added (greatly in excess compared with the quantity of silanols to graft) and the whole is heated to reflux. The elimination of the CTAB and the grafting of the TMMOS are monitored by IRTF spectroscopy, carried out on the film that has been previously removed from the mixture and rinsed for a few minutes in acetone. The index and thickness are measured by UV-Visible ellipsometry. The quantity of grafted methyl groups is calculated from the area of the Si—$CH_3$ band at 2965 cm$^{-1}$, depending on the thickness of the film.

After 18 hours of reflux, 1 mL of new TMMOS is added. Then about 1 h 30 min later 50 µL of triethylamine $(CH_3CH_2)_3$ N (TEA) is added to catalyse the reaction. When the reaction has finished, the index of the film, measured at 633 nm is stabilised and is 1.30. The comparison with a mesoporous film of 3d hexagonal silicon dioxide grafted with HMDS (in the vapour phase, cf. Example 1) indicates that the quantities of methyl grafted in the liquid and vapour phases are similar.

Example 4

Grafting in Dichloromethane ($CH_2Cl_2$); Simultaneous Elimination of CTAB

The method of Example 3 is reproduced, using 3,3,3-trifluoropropyldimethylchlorosilane
$CF_3$—$CH_2$—$CH_2$—$Si(CH_3)_2Cl$ instead of HMDS and 125 mL of dichloromethane instead of 125 mL of MEK.

The addition of triethylamine (TEA, 160 µL) after 18 hours of reflux makes it possible to catalyse the reaction.

The final refractive index of the film, measured at 633 nm is 1.338.

Example 5 to 8

In Example 2, the patent discloses the synthesis of organised mesoporous films, functionalised by using a first hydrophobic agent, MTEOS, which is introduced before the step (b) of depositing the film. In Examples 5 to 8, the same method is used to functionalise the films with different silanes. The table below indicates the results obtained.

| Example | Silane | Silane/TEOS molar ratio | Relative humidity during depositing | Phases obtained | Corresponding CTAB/TEOS weight ratios |
|---|---|---|---|---|---|
| 5 | VTEOS | 3/7 | 58% | H3d | 0.210 |
|   |   |   |   | C | 0.280-0.315 |
|   |   |   |   | H2d | 0.350 |
| 6 | DMDEOS | 4/6 | 53% | H2d | 0.210-0.350 |
| 7 | C$_3$fTMOS | 1/4 | 58% | H3d | 0.219 |
|   |   |   |   | C | 0.245-0.280 |
|   |   |   |   | H2d | 0.350 |
| 8 |   | 3/7 | 46% | H2d | 0.245-0.420 |

MTEOS: methyltriethoxysilane $CH_3$—$Si(OCH_2CH_3)_3$.
VTEOS: vinyltriethoxysilane $CH_2$=$CH$—$Si(OCH_2CH_3)_3$.
DMDEOS: dimethyldiethoxysilane $(CH_3)_2$—$Si(OCH_2CH_3)_2$.
C$_3$fTMOS: 3,3,3-trifluoropropyltrimethoxysilane $CF_3$—$CH_2$—$CH_2$—$Si(OCH_3)_3$.

Example 9

Depositing a Mesoporous Layer in an Antireflection Stack

The mesostructured layer is deposited on the following system:

The substrate used is a flat ORMA® lens (with a correction of −2 dioptres and a diameter of 65 mm) made by ESSILOR diethyleneglycol bisallylcarbonate copolymer (CR 39® from PPG Industries).

The convex surface of the lens is coated with an anti-abrasion coating prepared and formed as indicated below:

42.9 parts of 0.1 N hydrochloric acid are introduced dropwise into a solution containing 135.7 parts of γ-glycidoxypropyltrimethyloxysilane (GLYMO) and 49 parts of dimethyl diethoxysilane DMDES.

The hydrolysed solution is agitated for 24 hours at ambient temperature then 8.8 parts of aluminium acetylacetonate, 26.5 parts of ethylcellosolve and 400 parts of 30% colloidal silica in methanol and 157 parts of methanol are added.

A small quantity of surfactant agent is added.

The formulation is applied onto the surface of the lens then subjected to 15 minutes of pre-heating at 60° C. Then it is put in the oven at 100° C. minutes for 3 hours.

Surface preparation: the anti-abrasion coating is subjected to alkaline attack in an 5% aqueous solution of caustic soda at 50° C. for 3 min; it is rinsed in softened water, at ambient temperature; then in deionised water, at ambient temperature; then left in isopropanol at ambient temperature.

Depositing the high index layer (HI layer): then a high refractive index layer (HI) (thickness 135-140 nm, index 1.75, thermal treatment for about 10 seconds by infrared radiation) is deposited, by spin coating on the anti-abrasion coating.

The high index (HI) formulation of the Glymo/TiO$_2$ rutile colloid type is obtained in the following way:

90.45 g of glycidoxypropyltrimethoxysilane (Sivento) are weighed in a beaker and stirred continuously. 20.66 g of 0.1N acid water are added dropwise to the solution. The temperature is controlled during hydrolysis and must not reach 45° C.

When all the acid water has been added, the hydrolysate continues to be stirred for 15 minutes. 640 g of colloidal TiO$_2$ Optolake®.1120Z (11RU-7.A8) colloid (at 20% by weight of dry matter) from Catalyst and Chemical (CCIC) are weighed, 160 g of methanol are added to the colloidal solution and stirred at ambient temperature for 15 minutes.

800 g of the colloid-methanol solution are taken and added to the hydrolysed glycidoxypropyltrimethoxysilane.

The solution is left for 24 hours at ambient temperature with stirring.

9.14 g of 99% aluminium acetylacetonate ($[CH_3COCH$=$C(O—)CH_3]_3Al$, Sigma Aldrich) are weighed and added to the solution. 79.5 g of methanol are added to the mixture.

The solution remains 1 more hour at ambient temperature with stirring, then the dry extract is measured.

The value equals 20%.

The dilution solvent is isopropanol (Carlo-Erba). The quantity of solvent to weigh and to add to the solution must correspond to a 6% dilution of dry extract. This new 6% solution is left stirring for 5 hours and filtered at 3 μm then stored in a freezer at −18° C.

During the depositing, 1 mL of this solution is deposited by spin coating on the glasses.

Depositing the low index mesoporous layer (LI layer): a low index layer is then formed on the HI layer in the following way:

Silica sol preparation according to the method described in Example 1. After hydrolysis and condensation, and once the sol has returned to ambient temperature, it is filtered at 0.45 μm and cooled in an ice bath.

Meanwhile, the stock solution is prepared at 48.7 g/L of CTAB in ethanol. The solution is filtered at 0.45 μm.

3 mL of silica sol are taken and placed in a vial plunged in an ice bath. 67 μL of dilute hydrochloric acid at pH=1.25 are added.

Besides, 6.7 mL of the CTAB/ethanol solution are placed in another vial, and 0.75 mL of MTEOS are added. The flask is stirred.

The contents of the vial containing the acidified silica sol is poured into the vial containing the CTAB/ethanol/MTEOS mixture while stirring.

1 minute 30 seconds later, 8 mL of absolute alcohol is added, then a lapse of a few seconds is left.

2.5 mL of the mixture are deposited on the substrate, which is then set spinning at 5500 rpm for 2 minutes (acceleration of about 33 rotations/s$^2$). The chamber in which the deposit takes place is previously conditioned such that the relative humidity is 51%, with a strong nitrogen flow, at T=20-25° C.

After depositing, the sample is dried at ambient temperature for a few hours then the thermal consolidation is carried out at 110° C. for 12 hours.

The sample is then left in acetone at reflux for 2 hours, then immediately transferred into a multi-compartment reactor. One of the compartments contains 0.5 mL of HMDS taken in a pathological cabinet. This compartment is closed with a tap.

The main compartment, which contains the lens to be treated, is put under a primary vacuum (1 to 5 mm Hg) for a few minutes, after which the tap is opened to let the HMDS vapours pass over.

After a few seconds, the dynamic vacuum is cut and the HMDS vapour pressure is allowed to establish itself in the chamber. The HMDS is left in contact with the mesoporous for 1 hour, after which the chamber is purged several times with nitrogen before opening the reactor.

The thickness of the low index mesoporous layer obtained in this way is about 120 nm (130 nm just after depositing).

By way of comparison, identical substrates were prepared, coated with the same anti-abrasion substrate but with single layer antireflective coatings obtained by conventional techniques by evaporation under vacuum, in the following order, starting from the substrate:

|  | Material | Optical thickness |
| --- | --- | --- |
| first deposited layer | $ZrO_2$ | 55 nm |
| second deposited layer | $SiO_2$ | 30 nm |
| third deposited layer | $ZrO_2$ | 160 nm |
| fourth deposited layer | $SiO_2$ | 120 nm |

The antireflection obtained is a multilayer antireflection.

A substrate was also prepared coated with an anti-abrasion layer and a HI layer index 1.75, deposited by spin coating as described above and on which a LI mesoporous layer is deposited as follows:

The inorganic sol is prepared according to the method described in Example 1. Then 0.343 g of CTAB is dissolved in 20 mL of absolute ethanol, then 5 mL of sol is added once it has returned to ambient temperature. A few drops of the mixture are deposited on the substrate, which is then set spinning at 4000 rpm for 2 minutes (acceleration of about 66 rotations/$s^2$). The depositing takes place in a chamber such that the relative humidity is 60%.

The sample is then put in the oven at 110° C. minutes for 12 h hours, then soaked in ethanol at reflux for 5 hours.

The mesoporous layer based only on TEOS (without hydrophobic agent) has a thickness of about 116 nm and a refractive index of 1.29.

Reflectance Results

The reflectance spectrum of the treated surface is measured using a spectrophotometer, between 380 and 780 nm (RMS measurement: Reflectance Measurement System).

The results are given in the tables below:

|  | h (°) | C* | Rmean (%) | Rvis (%) |
| --- | --- | --- | --- | --- |
| AR multilayer (comparative) | 127.0 | 6.5 | 0.70 | 0.63 |
| Bilayer t = 0 (Comparative) without hydrophobic agent | 157.5 | 6.1 | 0.40 | 0.46 |
| Bilayer after 60 h in the silicagel (Comparative) without hydrophobic agent | 152.0 | 13.7 | 0.72 | 1.03 |
| Bilayer after 60 h in ambient air (Comparative) without hydrophobic agent | 140.6 | 16.1 | 1.49 | 2.17 |

The colorimetry and reflectance characteristics of the different systems studied. h (hue) in degrees, C* (colour saturation), Rmean (residual reflectance, mean of the visible spectrum), and Rvis (reflectance weighted by the eye sensitivity curve). The pairs (h, C*) and (Rmean, Rvis) are interdependent; the reflection coefficients (Rmean and Rvis) particularly will be considered here.

It will be observed that the performance of TEOS based bilayers containing no hydrophobic agent deteriorates rapidly.

Reflectance Results

The reflection coefficient of the face treated with the mesoporous layer according to the invention is measured by RMS several hours after extraction then a few days later. The lenses are kept at ambient temperature. The results are given in the table below:

|  | h(°) | C* | Rmean (%) | Rvis (%) |
| --- | --- | --- | --- | --- |
| Bilayer at t = 0 MTEOS/TEOS Treated with HMDS | 188 ± 4 | 3.4 ± 0.9 | 0.32 ± 0.02 | 0.24 ± 0.01 |
| Bilayer t = 7 days MTEOS/TEOS Treated with HMDS | 189 ± 3 | 3.4 ± 0.8 | 0.32 ± 0.01 | 0.24 ± 0.02 |
| Bilayer t = 14 days MTEOS/TEOS Treated with HMDS | 190 ± 2 | 4.0 ± 0.6 | 0.33 ± 0.01 | 0.26 ± 0.02 |
| Bilayer t = 22 days MTEOS/TEOS Treated with HMDS | 187 ± 2 | 4.8 ± 0.5 | 0.34 ± 0.01 | 0.29 ± 0.02 |
| AR multilayer (Comparative) | 127.0 | 6.5 | 0.70 | 0.63 |

It is noted that the bilayer made from the mesoporous low index material according to the invention is extremely effective. Moreover, it is fairly stable over time (on a timescale of at least two weeks). This stability is far better than that of a bilayer made from an untreated TEOS film.

Resistance to Wear Tests

Type of Tests Carried Out

N10blows

Adherence tests of antireflection layers between themselves or the antireflection layer on the varnish. Evaluation of the peel strength of the antireflection treatment by rubbing with an eraser covered with a Selvyt cloth imbibed with isopropanol (N× series of 10 solicitations). Result: Mark/12 from bad to good (3/12; 6/12; 9/12; 12/12; >12/12) for each face tested. The test is described in detail in the patent application WO 99/49097

Test Results:

|  | N10 blows |
| --- | --- |
| Bilayer with LI mesoporous (MTEOS/TEOS acetone extracted and HMDS grafted) | >12R[#] |

[#]The test goes up to 12, but the lenses were tested beyond this without further deterioration. 12R means "scratches" or fine lines, which are typical for this type of stack.

Contact Angle

The measurements are carried out on a Digidrop goniometer made by GBX. 4 μL of water are placed automatically on the surface of the sample to be studied, then the contact angle is measured. The following films are compared:
    a mesoporous TEOS based film extracted with acetone then grafted with HMDS;
    a mesoporous MTEOS/TEOS film extracted with acetone;
    a mesoporous MTEOS/TEOS film extracted with acetone and grafted with HMDS;

| Type of film | Contact angle with water |
|---|---|
| Mesoporous TEOS extracted with acetone then grafted HMDS | 65.5° |
| Mesoporous MTEOS/TEOS extracted with acetone | 64.6° |
| Mesoporous MTEOS/TEOS extracted with acetone then grafted HMDS | 75.3° |

The invention claimed is:

1. A method for producing an ophthalmic lens coated with a mesoporous layer having a refractive index that is stable over time comprising:
   (a) the preparation of a precursor sol of a mesoporous layer containing a precursor agent further defined as a compound with the formula:

$$M(X)_4 \qquad (I)$$

wherein, X is a hydrolysable group and M represents silicon or a tetravalent metal and mixtures of these; at least one organic solvent; at least one pore forming agent; and water, and optionally a catalyst for the hydrolysis of the X groups;
   (b) depositing a film of the precursor sol on a main surface of the ophthalmic lens and the formation of the mesoporous structure;
   (c) optionally the consolidation of the mesoporous structure of the deposited film;
   (d) the elimination of the pore forming agent; and
   (e) obtaining the ophthalmic lens coated with the mesoporous layer;
   wherein:
   (i) the method comprises elimination of the pore forming agent which is carried out at a temperature 150° C.; and
   (ii) the method comprises a step of introducing at least one reactive agent bearing at least one hydrophobic group before the deposition step (b) of the film of precursor sol and/or after the step (b).

2. The method of claim 1, wherein elimination of the pore forming agent is carried out at $\leq 130°$ C.

3. The method of claim 1, wherein no step is carried out at a temperature of over 150° C.

4. The method of claim 1, further comprising consolidating the mesoporous structure c) of the deposited film which includes heating to a temperature $\leq 150°$ C.

5. The method of claim 1, wherein X is an alkoxy, ester, or halogen.

6. The method of claim 1, wherein the hydrolysable groups of the precursor agent of formula (I) are alkoxy groups in C1-C4; the ester groups

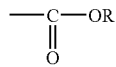

in which R is an alkyl radical in C1-C6; Cl, Br, I, or combinations of these groups.

7. The method of claim 1, wherein the tetravalent metal is at least one of Ti, Zr, Sn, and Si.

8. The method of claim 1, wherein the precursor agent is tetraethoxysilane (TEOS).

9. The method of claim 1, wherein the pore forming agent is an non-ionic, cationic, anionic or amphoteric surfactant.

10. The method of claim 9, wherein the pore forming agent is cetyltrimethylammonium bromide (CTAB), cetyltrimethylammonium chloride, a diblock copolymers of ethylene oxide and propylene oxide, a triblock copolymer of ethylene oxide and propylene oxide, a polyoxyalkylene alkylether, a ethoxylated acetylenic diol or a mixture of these.

11. The method of claim 1, wherein the weight ratio of the pore forming agent to the precursor agent and, optionally the reactive agent added to the precursor sol, varies from 0.01 to 5.

12. The method of claim 1, wherein the step of eliminating the pore forming agent is carried out by extraction using an organic solvent or a mixture of organic solvents, a fluid in the supercritical state, by degradation using UV and/or ozone radiation, treating by plasma or corona discharge.

13. The method of claim 1, wherein the precursor agent is hydrolysed and condensed before introducing at least one reagent bearing at least one hydrophobic group.

14. The method of claim 1, wherein the ophthalmic lens includes at least one coating, and wherein the mesoporous layer is formed on the at least one coating, wherein the at least one coating is an impact-resistant primer coating, anti-abrasion coating, or anti-reflective coating.

15. The method of claim 14, wherein the mesoporous layer is formed on a high refractive index layer (n>1.50), previously deposited on the ophthalmic lens, the mesoporous layer having a low refractive index (n$\leq$1.50), so that the combination of the high refractive index layer and the mesoporous layer forms a bilayer or multilayer anti-reflective coating.

16. The method of claim 1, wherein the mesoporous layer is coated with a hydrophobic and/or oleophobic film.

17. The method of claim 1, wherein the process comprises (ii) a step of introducing at least one reactive agent bearing at least one hydrophobic group before deposition step (b) of the film of precursor sol and/or during step (d).

18. The method of claim 1, wherein the process comprises (ii) either:
   a step of introducing at least one first reactive agent bearing at least one hydrophobic group before the deposition step (b) of the film of precursor sol and/or after step (b) and introducing at least one second reactive agent different from the first reactive agent, bearing at least one hydrophobic group after step (b) or, if any, after step (c), or
   a step of introducing at least one second reactive agent bearing at least one hydrophobic group after or during step (d).

19. The method of claim 1, wherein the refractive index is stable for at least two weeks.

20. A method for producing a substrate coated with a mesoporous layer having a refractive index that is stable over time comprising:
   (a) the preparation of a precursor sol of a mesoporous layer containing a precursor agent further defined as a compound with the formula:

$$M(X)_4 \qquad (I)$$

wherein, X is a hydrolysable group and M represents silicon or a tetravalent metal and mixtures of these; at least one organic solvent; at least one pore forming agent; and water, and optionally a catalyst for the hydrolysis of the X groups;
   (b) depositing a film of the precursor sol on a main surface of the substrate and the formation of the mesoporous structure;
   (c) optionally the consolidation of the mesoporous structure of the deposited film;

(d) the elimination of the pore forming agent; and
(e) obtaining the substrate coated with the mesoporous layer;
wherein:
(i) the method comprises elimination of the pore forming agent which is carried out at a temperature ≦150° C.; and
(ii) the method comprises a step of introducing at least one reactive agent bearing at least one hydrophobic group before the deposition step (b) of the film of precursor sol and/or after the step (b),
wherein at least one reagent bearing hydrophobic groups is added during step (d).

21. A method for producing a substrate coated with a mesoporous layer having a refractive index that is stable over time comprising:
(a) the preparation of a precursor sol of a mesoporous layer containing a precursor agent further defined as a compound with the formula:

$$M(X)_4 \qquad (I)$$

wherein, X is a hydrolysable group and M represents silicon or a tetravalent metal and mixtures of these; at least one organic solvent; at least one pore forming agent; and water, and optionally a catalyst for the hydrolysis of the X groups;
(b) depositing a film of the precursor sol on a main surface of the substrate and the formation of the mesoporous structure;
(c) optionally the consolidation of the mesoporous structure of the deposited film;
(d) the elimination of the pore forming agent; and
(e) obtaining the substrate coated with the mesoporous layer;
wherein:
(i) the method comprises elimination of the pore forming agent which is carried out at a temperature ≦150° C.; and
(ii) the method comprises a step of introducing at least one reactive agent bearing at least one hydrophobic group before the deposition step (h) of the film of precursor sol and/or after the step (b)
wherein the step of introducing (ii) a reactive agent bearing at least one hydrophobic group comprises adding to the precursor sol, before the deposition step (b) of the film of the precursor sol, at least one first reagent bearing at least one hydrophobic group and introducing into the mesoporous layer after step (b) or (c) at least one second reagent different from the first reagent, bearing at least one hydrophobic group.

22. The method of claim 21, wherein the first reagent bearing at least one hydrophobic group having the formula:

$$(R^1)_{n_1}(R^2)_{n_2}Si \qquad (II)$$

or $$(R^3)_{n_3}(R^4)_{n_4}Si\text{—}R'\text{—}Si(R^5)_{n_5}(R^6)_{n_6} \qquad (III)$$

wherein:
$R^1$, $R^3$ and $R^5$ represent a saturated or unsaturated hydrocarbon group, a vinyl group, an aryl group, and fluorinated or perfluorinated analogues of these groups;
$R^2$, $R^4$ and $R^6$ are hydrolyzable groups;
R' is an alkylene or arylene group;
$n_1$ is an integer from 1 to 3;
$n_2$ is an integer from 1 to 3; and $n_1+n_2=4$;

$n_3$, $n_4$, $n_5$, and $n_6$ are integers from 0 to 3 with the condition that the sums $n_3+n_5$ and $n_4+n_6$ are not equal to zero; and
$n_3+n_4=n_5+n_6=3$.

23. The method of claim 22, wherein $R^2$, $R^4$ and $R^6$ are alkoxy groups in C1-C4; the ester groups

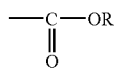

in which R is an alkyl radical in C1-C6.

24. The method of claim 22, wherein the first reagent is methyltriethoxysilane (MTEOS).

25. The method of claim 21, wherein the molar ratio of the first reagent to the precursor agent varies from 10/90 to 50/50.

26. The method of claim 21, wherein the second reagent bearing at least one hydrophobic group is a silicon compound with a single function capable of reacting with the hydroxyl groups of the mesoporous layer.

27. The method of claim 26, wherein the silicon compound comprises at least one trialkylsilyl group.

28. The method of claim 26, wherein the second reagent is a chlorosilane, a fluorosilane, or a disilazane.

29. The method of claim 26, wherein the second reagent is trimethylmethoxysilane, 3,3,3-trifluoropropyldimethylchlorosilane, or hexamethyldisilazane (HMDS).

30. The method of claim 21, wherein no step is carried out at a temperature of over 150° C.

31. The method of claim 21, wherein X is an alkoxy, ester, or halogen.

32. The method of claim 21, wherein the tetravalent metal is at least one of Ti, Zr, Sn, and Si.

33. The method of claim 21, wherein the pore forming agent is an non-ionic, cationic, anionic or amphoteric surfactant.

34. A method for producing a substrate coated with a mesoporous layer having a refractive index that is stable over time comprising:
(a) the preparation of a precursor sol of a mesoporous layer containing a precursor agent further defined as a compound with the formula:

$$M(X)_4 \qquad (I)$$

wherein, X is a hydrolysable group and M represents silicon or a tetravalent metal and mixtures of these; at least one organic solvent; at least one pore forming agent; and water, and optionally a catalyst for the hydrolysis of the X groups;
(b) depositing a film of the precursor sol on a main surface of the substrate and the formation of the mesoporous structure;
(c) optionally the consolidation of the mesoporous structure of the deposited film;
(d) the elimination of the pore forming agent; and
(e) obtaining the substrate coated with the mesoporous layer;
wherein:
(i) the method comprises elimination of the pore forming agent which is carried out at a temperature ≦150° C.; and (ii) the method comprises a step of introducing at least one reactive agent bearing at least one hydrophobic group before the deposition step (b) of the film of precursor sol and/or after the step (b), wherein the step of introducing (ii) at least one reactive agent bearing at least one hydrophobic group only comprises introducing into the mesoporous layer after or during the elimination step (d) of the pore forming agent, at least one reagent bearing at least one hydrophobic group.

35. The method of claim 34, wherein the reagent is a silicon compound with a single function capable of reacting with the hydroxyl groups of the mesoporous layer.

36. The method of claim 35, wherein the silicon compound comprises at least one trialkylsilyl group.

* * * * *

UNITED STATES PATENT AND TRADEMARK OFFICE
CERTIFICATE OF CORRECTION

PATENT NO. : 8,182,866 B2  
APPLICATION NO. : 11/573137  
DATED : May 22, 2012  
INVENTOR(S) : Muriel Matheron et al.

It is certified that error appears in the above-identified patent and that said Letters Patent is hereby corrected as shown below:

In claim 1, column 21, line 37, delete "temperature 150° C." and insert --temperature $\leq$ 150° C.-- therefor.

In claim 21, column 23, line 41, delete "(h)" and insert --(b)-- therefor.

Signed and Sealed this  
Twenty-fourth Day of July, 2012

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 8,182,866 B2 | Page 1 of 1 |
| APPLICATION NO. | : 11/573137 | |
| DATED | : May 22, 2012 | |
| INVENTOR(S) | : Muriel Matheron et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1416 days.

Signed and Sealed this
Fourth Day of September, 2012

David J. Kappos
*Director of the United States Patent and Trademark Office*